UNITED STATES PATENT OFFICE.

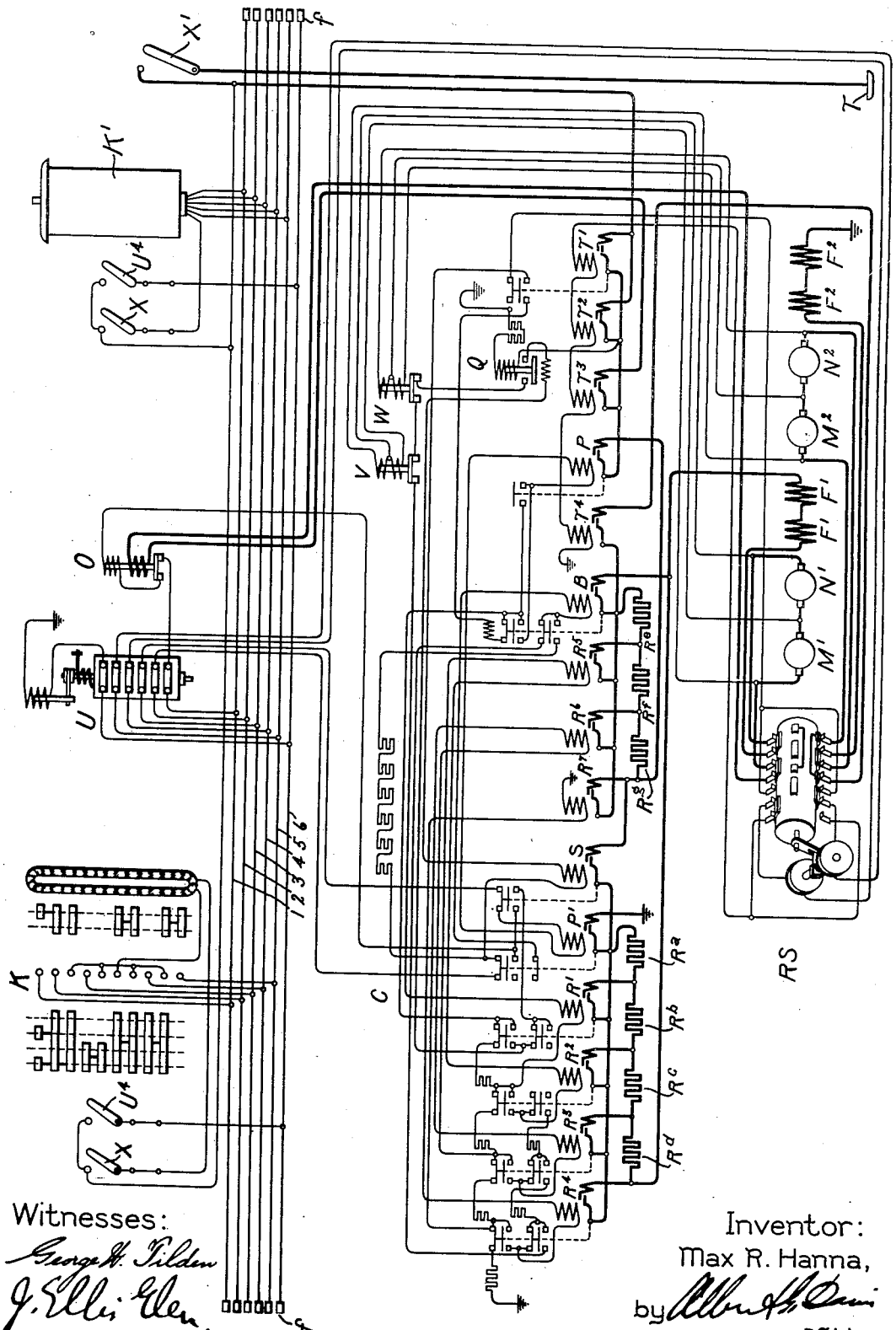

MAX R. HANNA, OF SCHENECTADY, NEW YORK, ASSIGNOR TO GENERAL ELECTRIC COMPANY, A CORPORATION OF NEW YORK.

MOTOR-CONTROL SYSTEM FOR ELECTRIC VEHICLES.

No. 905,697.   Specification of Letters Patent.   Patented Dec. 1, 1908.

Application filed March 16, 1908. Serial No. 421,413.

*To all whom it may concern:*

Be it known that I, MAX R. HANNA, a citizen of the United States, residing at Schenectady, county of Schenectady, State of New York, have invented certain new and useful Improvements in Motor-Control Systems for Electric Vehicles, of which the following is a specification.

My invention relates to systems of motor control and more particularly to devices adapted for the regulation of motors employed for the driving of vehicles such as railway cars.

It has been found in practice that in starting electrically driven vehicles which are provided with two or more driving motors the wheels driven by one of the motors may slip and the speed of this motor therefore becomes different from the speed of the other motor or motors on the car. This slipping of one pair of wheels may be due to a variety of causes such as inequalities in the track, variations in the surface of the car wheels, the presence of ice, water, oil, leaves, etc., on the rails. When the wheels driven by a motor begin to slip the coefficient of friction between the wheels and the rails immediately decreases very much and the slipping when once started, therefore, tends to continue. If the motors of a car are connected in series when the wheels driven by one of them slip, the increased counter electromotive force of that motor, because of its increased speed, cuts down the current flowing to all the motors and acts to decrease the speed of the motors whose wheels are not slipping. The decrease in speed of the last mentioned motors causes a decrease in the counter electromotive force produced by them and a corresponding increase in the potential applied to the motor driving the slipping wheels, with a resulting tendency to further increase the speed of that motor. It is apparent, therefore, that when once the wheels driven by a motor begin to slip the tendency is for that motor to speed up and for the other motors in series with it to slow down, even, perhaps, until all the motors of the car but one are at rest and that one is, therefore, receiving nearly the full line potential. Thus a motor may have applied to it a potential much in excess of that for which it was designed and a "flash over" or arcing from brush to brush may result.

While slipping of the wheels of one motor with respect to the wheels of the other motor may occur on cars equipped with only two motors, the danger of a "flash over" under this condition is small since each motor is designed to stand full line potential and, therefore, even if one motor should speed up and the other one entirely stop the potential applied to the slipping motor would not be in excess of that for which it was designed. The danger, however, becomes much greater with cars equipped with four motors arranged in two groups of two each, the motors in each group being permanently connected in series, each motor being designed for one-half the line potential. Under this condition if, in starting while all four motors are in series, the wheels of one of them slip the other three motors at once tend to slow down and the potential applied to the motor driving the slipping wheels may rise nearly to full line potential or almost twice as high as the potential for which the motor was designed. Or if, with an equipment of this kind when the pairs of motors are in parallel relation, the wheels of a motor of one of the pairs begins to slip, the speed of the other motor in that pair is immediately decreased and nearly full line potential is applied to the motor driving the slipping wheels.

In order to prevent injury to the motors, under the above described condition, it has been proposed heretofore to use a differential relay arranged to operate when the wheels driven by one motor slip and in operating to interrupt the control circuits to all the contactors, thereby causing them to drop and interrupt the motor circuits and break the connection of the motors with the line. I have found, however, that since the slipping of a pair of wheels is but a momentary condition it is not necessary to interrupt the connection of the motor circuits with the source of current supply. It is quite sufficient if the motor circuits be restored to their slowest speed condition without interrupting their connection with the source of supply, if the slipping takes place while any other condition of the motor circuits exists. In my arrangement, therefore, I provide means for interrupting all control circuits except those which control the switches which connect the motor circuits to the source of current supply and arrange the motors in series.

In multiple unit train control systems it has been customary heretofore to provide means, usually a relay, for interrupting all the control circuits except those which lead to the switches which connect the motor circuits to the source of current supply and arrange the motors in series if at any time the voltage at the source fails, as may often happen by the current collecting device leaving the trolley or third rail, or by this device engaging a section of trolley or third rail which is not energized. I have, therefore, in carrying out my present invention, combined with this last mentioned arrangement differential relays so arranged that they will interrupt the same circuit as that interrupted by the no-voltage relay just mentioned.

My present invention comprises, therefore, in a motor control system, means for interrupting all the control circuits except those which lead to the switches which connect the motor circuits to the source of current supply and those which arrange the motors in the series or starting position if while the motor circuits are in any other condition the speed of one of the motors becomes different from that of the other motors, or if the voltage at the source fails.

My invention is, as has been stated, especially useful in connection with four motor equipments in which the motors are arranged in pairs with the motors of each pair permanently connected in series, and it is in connection with an equipment of this kind that I have illustrated a preferred embodiment thereof.

The single figure of the drawing shows diagrammatically a motor and control equipment, adapted to form one unit of a train, having my invention applied thereto.

The control system which I have illustrated is exactly the same as that shown in the patent to George H. Hill, No. 815,826, dated March 20, 1906, except that in place of each motor shown in his patent, I have substituted two motors having their armatures and field coils permanently connected in series, and except that my invention is applied thereto in a manner hereinafter described.

A detailed description of the control system which I have shown, in so far as it is similar to the one illustrated in the patent above mentioned, is unnecessary. It is quite sufficient to point out the various elements of the system by the names applied to them in the patent above mentioned, and as now generally used in this art.

The armatures of the motors of one pair are indicated at $M^1$ and $N^1$ and the other pair at $M^2$ and $N^2$, the armatures of each pair being permanently connected in series as are also the field coils of each pair which are shown at $F^1$ $F^1$ and $F^2$ $F^2$.

C indicates a motor controller of the separately actuated contact type including line contacts $T^1$, $T^2$, $T^3$ and $T^4$; resistance contacts $R^1$, $R^2$, $R^3$, $R^4$, $R^5$, $R^6$ and $R^7$, controlling resistances $R^a$ to $R^g$; a contact S which connects the pairs of motors in series; contacts P and $P^1$ which make the parallel connections for the pairs of motors; and contact B which serves to complete a bridge connection about the series contact and the resistances before the series contact is broken in changing from series to parallel.

The throttling and checking relay, generally referred to as the "notching relay", is shown at O.

The reversing switch for determining the direction in which current passes through the armatures of the pairs of motors is shown at RS.

At K the master-controller, located at one end of the car, is shown in developed form, while at $K^1$ the master-controller, at the opposite end of the car, is indicated in outline.

The trolley or third rail shoe is indicated at T, it being understood that the rails or ground are utilized as a return circuit.

X and $X^1$ are main switches for the control and motor circuits respectively.

1, 2, 3, 4 and 5 are train wires by which the master-controllers on the various cars of a train may be connected in parallel to the local control circuits of the several cars, these wires having suitable couplings $f$ at their ends whereby connection between cars may be made.

U indicates a cut-out switch which is arranged between the train wires and the motor-controller C and the reversing switch RS, means being provided for opening this switch on all the cars of a train by closing one of the switches $U^4$ on any car of the train. The relay Q is a no-voltage relay arranged to interrupt the circuit through one of the control wires, and thereby to return the motor-controller C to its first series condition if at any time current for the motor circuit fails, as for instance by the third rail shoe or trolley T becoming disengaged from the third rail or trolley wire.

All of the parts just referred to are shown and fully described in the patent to Hill, No. 815,826, above mentioned.

At V is shown a differential relay, the two coils of which are connected respectively in shunt to the armatures $M^1$ and $N^1$ of one pair of motors, and at W is shown another differential relay, the coils of which are connected respectively in shunt to the armatures $M^2$ and $N^2$ of the other pair of motors. The coils of each relay V and W are so wound and arranged that when the counter electromotive force of the armatures to which they are connected and therefore the current in the coils are the same, the resultant magnetic field acting on the core of each relay will be practically zero. When, therefore, both motors of a pair are running at the same rate of speed and, therefore, producing the same counter electromotive forces, the differential relay connected to them will not pull up. The differential relays V and W bridge contacts in the same control circuit as that controlled by the no-voltage relay Q.

The operation of the control system shown is, except for the action of the differential relays V and W, fully set forth in the patent to Hill, No. 815,826, and need not be redescribed. As long as the motors in each pair drive the wheels attached to them without slipping upon the track the system will operate exactly as does that shown in the Hill patent. If, however, the wheels driven by one of the motors of either pair slip the differential relay V or W connected to that pair of motors will pull up and interrupt that control circuit in which the no-voltage relay Q is located, thereby affecting the motor circuits in exactly the same manner as if the relay Q had dropped, due to interruption of the motor supply circuit. In other words, if the wheels driven by a motor of either pair slip the corresponding differential relay V or W acts to interrupt all the control circuits except those controlling the switches which connect the motors to the source of current, and arrange the pairs of motors in series. When the wheels driven by any motor slip, therefore, the motor circuits are restored to the series arrangement of the pairs of motors with all the resistance in circuit without opening the line switches, the effect of which is to so reduce the potential applied to the slipping motor as to effectively protect this motor from injury. The differential relays V and W thus act in conjunction with the no-voltage relay Q to protect the motors under certain conditions which may arise during operation.

What I claim as new and desire to secure by Letters Patent of the United States, is,—

1. In combination, a plurality of motors or groups of motors, resistances for insertion in the motor circuits, a plurality of electrically controlled switches for connecting said motors to a source of current, for regulating the amount of resistance in the motor circuits and for connecting the motors or groups of motors in series and in parallel, a master-controller, control circuits for interconnecting said master-controller and said switches, and means for restoring the motor circuits to the series arrangement of the motors or groups of motors with all the resistance in circuit without opening the line switches if while the motor circuits are in any other condition the voltage at the source of motor current fails, or if the speeds of the motors become different.

2. In combination, a plurality of motors or groups of motors, resistances for insertion in the motor circuits, a plurality of electrically controlled switches for connecting said motors to a source of current, for regulating the amount of resistance in the motor circuits and for connecting the motors or groups of motors in series and in parallel, a master-controller, control circuits for interconnecting said master-controller and said switches, and means for interrupting all the control circuits except those controlling the switches which connect the motors to the source of current and arrange the motors or groups of motors in series if at any time the voltage at the source of motor current fails or if the speeds of the motors become different.

3. In an electrically driven vehicle, two pairs of motors, the motors of each pair being permanently connected in series, resistances for insertion in the motor circuits, a plurality of electrically controlled switches for connecting said pairs of motors to a source of current, for regulating the amount of resistance in the motor circuits and for connecting the pairs of motors in series and in parallel, a master-controller, control circuits for interconnecting said master-controller and said switches, and means for restoring the motor circuits to the series arrangement of the pairs of motors with all the resistance in circuit without disconnecting the motor circuits from the source if while the motor circuits are in any other condition the voltage at the source of motor current fails or if the speeds of the motors in either pair become different.

4. In an electrically driven vehicle, two pairs of motors, the motors of each pair being permanently connected in series, resistances for insertion in the motor circuits, a plurality of electrically controlled switches for connecting said pairs of motors to a source of current, for regulating the amount of resistance in the motor circuits and for connecting the pairs of motors in series and in parallel, a master-controller, control circuits for interconnecting said master-controller and said switches, and means for interrupting all the control circuits except those controlling the switches which connect the motor circuits to the source of current and arrange the pairs of motors in series if at any time the voltage at the source of motor current fails or if the speeds of the motors in either pair become different.

5. In an electrically driven vehicle, two pairs of motors, the motors of each pair being permanently connected in series, resistances for insertion in the motor circuits, a plurality of electrically controlled switches for connecting said pairs of motors to a source of current, for regulating the amount of resistance in the motor circuits and for connecting the pairs of motors in series and in parallel, a master-controller, control circuits for interconnecting said master-controller and said switches, and differential relays each operative upon the speeds of the motors in either of the pairs becoming different and arranged to interrupt all the control circuits except those which control the switches which connect the motor circuits to the source of current and arrange the pairs of motors in series.

6. In an electrically driven vehicle, two pairs of motors, the motors of each pair being permanently connected in series, resistances for insertion in the motor circuits, a plurality of electrically controlled switches for connecting said pairs of motors to a source of current, for regulating the amount of resistance in the motor circuits and for connecting the pairs of motors in series and in parallel, a master-controller, control circuits for interconnecting said master-controller and said switches, a relay arranged to interrupt all the control circuits except those controlling the switches which connect the motor circuits to the source of current and arrange the pairs of motors in series if at any time the voltage at the source of motor current fails, and differential relays each operative upon the speeds of the motors in either of the pairs becoming different and arranged to interrupt the same circuits as does the first mentioned relay.

In witness whereof, I have hereunto set my hand this 14th day of March, 1908.

MAX R. HANNA.

Witnesses:
BENJAMIN B. HULL,
HELEN ORFORD.